United States Patent [19]
Jethwa et al.

[11] 3,864,263
[45] Feb. 4, 1975

[54] CHROMATOGRAPHIC PLATE DEVICE

[75] Inventors: Keshavlal Raghavji Jethwa, Kingston; Maurice Henry Bennie, Greenhithe, both of England

[73] Assignee: The Welcome Foundation Limited, London, England

[22] Filed: Apr. 11, 1973

[21] Appl. No.: 349,997

[30] Foreign Application Priority Data
Apr. 13, 1972  Great Britain.................... 17051/72
Mar. 7, 1973  Great Britain...................... 5934/73

[52] U.S. Cl............. 210/198 C, 33/1 R, 33/125 A, 73/61.1 C
[51] Int. Cl............................................ B01d 15/08
[58] Field of Search...................... 210/31 C, 198 C; 73/61.1 C; 33/1 R, 125 R, 1 B, 1 D

[56] References Cited
UNITED STATES PATENTS

| | | | |
|---|---|---|---|
| 2,831,252 | 4/1958 | Weichselbaum.................. | 33/125 R |
| 2,945,301 | 7/1960 | Peterson............................. | 33/1 R |
| 2,948,965 | 8/1960 | Haylea................................ | 33/125 R |
| 3,623,602 | 11/1971 | Valente.......................... | 210/198 C X |

FOREIGN PATENTS OR APPLICATIONS
1,037,867  8/1966  Great Britain.................. 73/61.1 C

*Primary Examiner*—John Adee
*Attorney, Agent, or Firm*—Dike, Bronstein, Roberts, Cushman & Pfund

[57]  ABSTRACT

A device enabling the rapid and direct determination of Rf values in thin-layer chromatography consisting of a transparent plate in combination with a cursor; the cursor comprising a locating and a measuring portion having an Rf measuring scale.

14 Claims, 5 Drawing Figures

CHROMATOGRAPHIC PLATE DEVICE

The present invention relates to a device for use in chemical fractionation by means of thin layer chromatography.

In the art of thin layer chromatography a sample of a mixture is applied to one part of a thin layer plate which comprises an inert and impervious base coated with a uniform thin layer of absorbent material. The thin layer plate is usually square or rectangular and the sample is usually applied adjacent to a base edge of the plate. The mixture is then fractionated by continuously applying a solvent or mixture of solvents to the base edge. Since the thin layer is of an absorbent material a solvent front will proceed through the plate at right angles to the base edge so long as solvent is applied to the base edge. The components of the mixture will then be dispersed substantially along a line between the part of the plate to which the mixture was applied and the solvent front, the line being perpendicular to the solvent front. If necessary, for instance, when the components of the mixture are colourless, the plate is subsequently chemically developed to render the components visible. To limit diffusion of the components in the thin layer the plate may be finally dried.

To obtain maximum separation of the components using a given solvent or solvents it is desirable to localise the application of the sample of mixture as much as possible.

For the purposes of comparison of fractionations carried out under various circumstances and to assist in the identification of the compounds it is desirable to accurately reward the behaviour of the components under fractionation. This is conveniently effected by means of the Rf value of a component. The Rf value of a given component is the distance between the component and the point of application relative to the distance between the solvent front and the point of application for a given solvent or mixture of solvents. The latter distance is given the value 1.0 and is commonly described as 'length of run;' thus all Rf values are fractions of 1.0. It is therefore desirable to determine Rf values of different components on a thin layer plate as quickly and easily as possible. Towards this end it is also desirable, where comparisons of two or more samples are required, that said samples should be accurately applied to a common start line.

At the present time there is available a number or different types of combinations of thin layer of adsorbent material and inert base material, which may be used successfully with a device of the present invention. For convenience all such combinations have been referred to as chromatographic sheet.

A number of prior art devices are available. However, none of these has been found to be wholly satisfactory.

It has now been found that an accurate and localised application of samples of a mixture to a thin layer plate and the rapid and direct determination of Rf values of components of the mixture subsequent to fractionation may be obtained by a device of the present invention. Moreover, this device does not suffer from many of the disadvantages of the prior art devices as will become apparent in the subsequent description.

Accordingly the present invention provides a measuring device suitable for use in thin-layer chromatography which device comprises in combination a substantially transparent plate having two opposed side walls which elevate said plate above a plane surface when placed thereon, a base wall between the side walls to locate a chromatographic sheet when placed beneath the plate, relative to the plate, and a linear array of orifices in said plate adjacent and substantially parallel to the base wall; and a cursor comprising a measuring portion of substantially transparent material slidable on the plate and having a scale for the measurement of Rf values of chemical components in a chromatographic sheet when placed beneath the plate, and a locating portion for sliding co-operation with an edge of the plate which lies parallel to the linear array of orifices to enable Rf values to be read.

In the use of a device of the present invention for applying samples to a chromatographic sheet, the transparent plate is located over the sheet so that the base wall abuts the edge of the chromatographic sheet to which edge it is desired to apply solvent for the purposes of fractionation, and optionally abuts one of the side walls. Samples may then be applied to the chromatographic sheet via said orifices by conventional techniques.

Conveniently, a portion of the transparent plate is cut away at a corner adjacent to the base wall and a side wall thereby enabling access of the fingers to a chromatographic sheet when placed beneath the plate, for instance, in the case where it is desired to adjust the position of the chromatographic sheet relative to the device, although of course in practice it will usually be more convenient to move the device relative to the chromatographic sheet.

As an optional feature of the invention, the distance between the linear array of orifices and an edge (hereinafter referred to as the top edge) of the transparent plate remote from the base wall, when this is parallel to the linear array of orifices, corresponds to the length of run most commonly used, where the length of run is the distance between the point of sample application and the furthest point the solvent front is allowed to reach on the chromatographic sheet. It is then possible to apply a linear mark to the chromatographic sheet, in order to define the desired limit of run, by using the top edge as a guide when the device is in position over a thin layer plate in readiness for sample application. In practice, a plurality of different lengths of run are used and the transparent plate may be provided with the required number of slits having one long edge parallel to the linear array of orifices whereby a chromatographic sheet placed beneath the plate may be marked by a scriber passed through the slit. For example, commonly used lengths of run are 10 and 15 cms.

It is preferable that the orifices should have a diameter at the under surface of the plate greater than that at the upper surface of said plate. This feature minimises the possibility of contact between the side of the orifice and the sample to be applied to a chromatographic sheet.

A cursor to be used in combination with the transparent plate may or may not have the measuring portion integral with the locating portion. In the case where the two portions are integral, the locating portion may constitute a lip for sliding co-operation with an edge of the plate which is parallel to the linear array of orifices. However, in the preferred embodiment where the two portions are not integral, the measuring and locating portions of the cursor may constitute two arms which are pivoted to each other whereby the measuring arm can be pivoted about an axis perpendicular to the plane of the plate when used therewith. It is preferred that the two arms are pivoted together at a point adjacent to one end of each of the arms and that the two arms can be locked together at any angle between them. It is even further preferred that the locating arm comprises a member of substantially rigid material disposed in two planes substantially perpendicular to each other, and the measuring arm comprises a strip of substantially rigid and transparent material having a scale for the measurement of Rf values of chemical components and pivoted to the locating arm whereby the locating arm when placed on the plate sits thereon substantially coplanar with both the upper surface of the plate and the base wall, and the measuring arm lies upon and may be freely moved upon the upper surface of the plate about the pivot axis.

The scale for the measurement of Rf values desirably comprises an unit of length subdivided in a decimal system. In the case of an integral cursor the unit of length should correspond to the length of run on a chromatographic sheet and where the transparent plate is provided with one or more slits as described hereinbefore, the cursor should accordingly be provided with additional scales, all commencing at the same zero line and each scale having divisions each corresponding to one tenth of the length of the corresponding run. It is thus possible to directly determine Rf values of components fractionated by means of thin layer chromatography since the distance between the point of application of the sample and the furthest point reached by the solvent front is automatically calibrated in terms of a linear decimal scale, when said distance corresponds to ten divisions of one of said Rf measuring scales.

In the case where the cursor comprises a measuring and a locating arm, the unit of length should preferably be greater than or equal to the length of run on a chromatographic sheet when used therewith. Also, it is preferred that the pivot axis of the locating and measuring arms coincides with the zero point of the Rf scale and that, when the cursor functionally co-operates with the plate, said axis bisects a line drawn between the centre of each of the orifices. It will of course be understood that a plate as described herein need not incorporate any slits when used with a cursor of this embodiment since its own construction permits the measurement of any length of solvent run within the limit of the measuring scale.

A device of the invention may be made of any substantially transparent rigid material although a plastics material is preferred particularly a polyacrylate material such as Perspex.

Further advantages of the present invention will become apparent from the following description of the embodiments of the invention, which embodiments however do not limit the present invention in any way.

DETAILED DESCRIPTION OF THE DISCLOSURE

Figure 1:
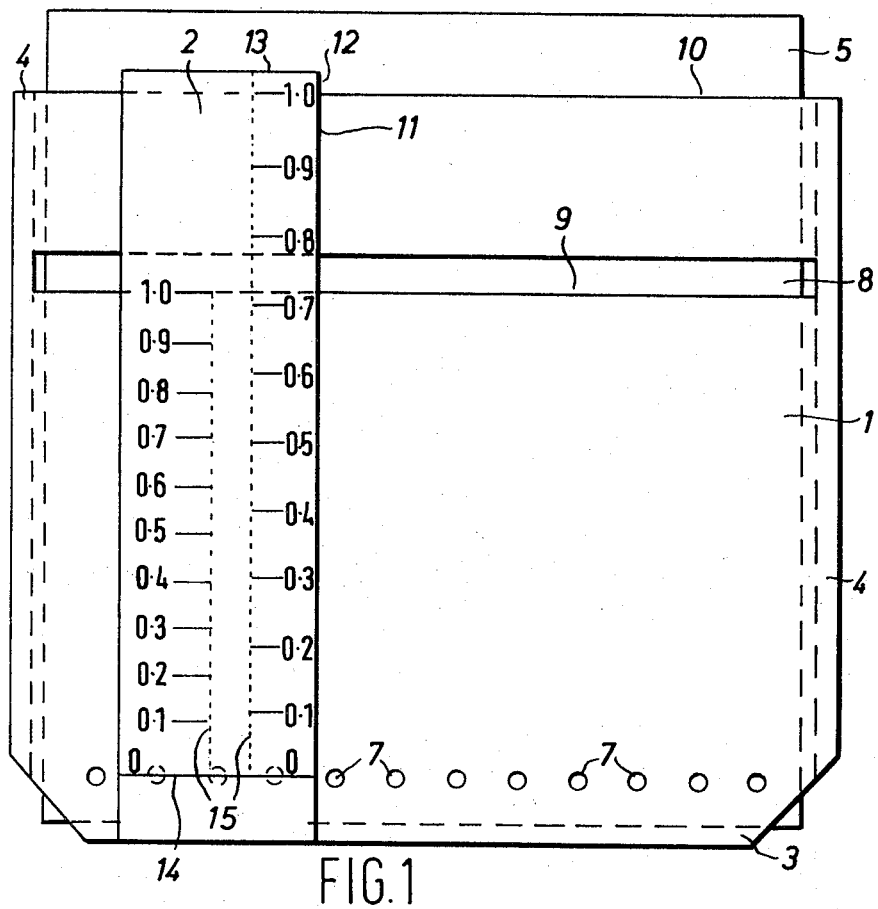
FIG. 1 is a plan view of a device of the present invention shown together with a chromatographic sheet.
Figure 2:
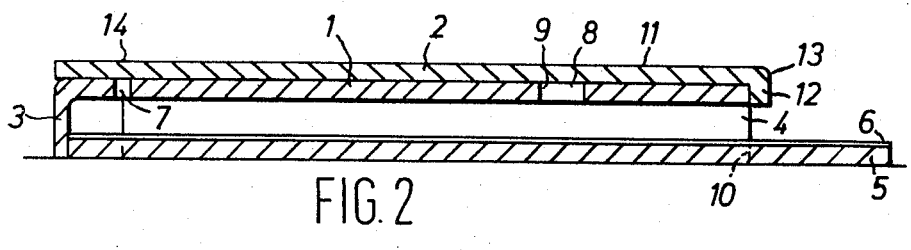
FIG. 2 is a vertical section through the device and the chromatographic sheet, shown in FIG. 1.

In the drawings FIG. 1 is a plan view of a device of the present invention shown together with a chromatographic sheet; and FIG. 2 is a vertical section through the device and the chromatographic sheet, shown in FIG. 1.

The device comprises a transparent plate 1 and a cursor 2.

The transparent plate has a base wall 3 and two side walls 4. The side walls 4 support the transparent plate 1 above a chromatographic sheet 5 having a thin layer of adsorbent material 6. In use of the device, the base wall 3 abuts the sheet 5 thereby substantially determining the position of the sheet 5 relative to the transparent plate 1.

The transparent plate 1 is also provided with a linear array of equally spaced orifices 7 adjacent to and parallel to the base wall 3. These orifices 7 each expose a small area of the sheet 5 onto which sample may be applied by means of a suitable applicator guided through said orifice 7.

In certain cirucmstances it may be desirable to make repeated applications of a sample onto one part of the sheet 5, for example, where a sample is particularly dilute, in which case it may be necessary to dry the sheet 5 in order to limit diffusion of the sample. In such a case the transparent plate 1 may be located so that the sheet 5 abuts a side wall 4 as well as the base wall 3. In this way the relative positions of the transparent plate 1 and the sheet 5 may be readily and reproducibly re-established to a high degree of accuracy thereby allowing removal of the device in between the application of various samples, as and where necessary, whilst at the same time retaining accuracy of location of sample application.

The transparent plate 1 is also provided with a slit 8 having a long edge 9 parallel to the orifices 7 and 10 cm distance from said orifices 7. By placing a suitable marking device such as a scriber adjacent to said long edge 9 a continuous linear mark may be made in the thin layer of absorbent material 6 of the sheet 5. Such a linear mark serves to indicate when, in the course of processing the sheet 5, a particular desired length of run, in this case 10 cm, has been achieved.

The transparent plate 1 also has a top edge 10 parallel to the orifices 7 and 15 cm distant therefrom. This top edge 10 may be used in the same way as the long edge 9 as aforementioned.

The cursor 2 comprises a transparent rectangular plate 11 having a lip 12 along a short edge 13 of the rectangular plate 11, said short edge 13 being substantially shorter than the distance between the side walls 4.

The rectangular plate 11 bears a bold line 14 parallel to and at a distance of 15 cm from the rib 12. The rectangular plate 11 also bears two scales 15 for the measurement of Rf values: one scale 10 cm and the other scale 15 cm in length, said scales 15 having their origin at and being perpendicular to the bold line 14.

In use of the device for determining Rf values a sheet 5 is located underneath the transparent plate 1 so that it abuts the base wall 3; samples are applied as described hereinabove; the sheet 5 removed for processing (using a run of 10 cm or 15 cm); the original relative positions of the sheet 5 and the transparent plate 1 re-established; the cursor 2 slidably located on the transparent plate 1, the lip 12 abutting the top edge 10, so that the appropriate scale 15 is located immediately above the component whose Rf value is to be determined; and the Rf value of that component directly read off.

A further embodiment of the invention is described below with reference to FIGS. 3, 4, and 5.

Figure 3:
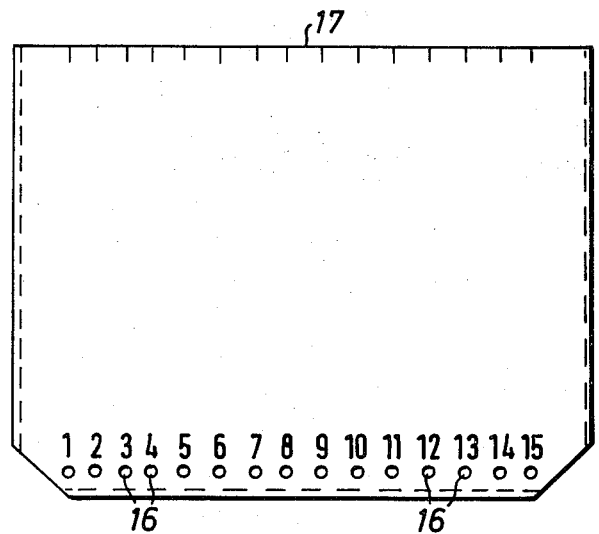
FIG. 3 shows a plan view of a further embodiment of the invention.

FIG. 3 shows a plan view of a further transparent acrylic plate 28 in accordance with the invention which omits the slot 8 shown in FIG. 1. The orifices 16 which are frustroconical in shape, are numbered and bear corresponding markings at the top edge 17.

Figure 4:
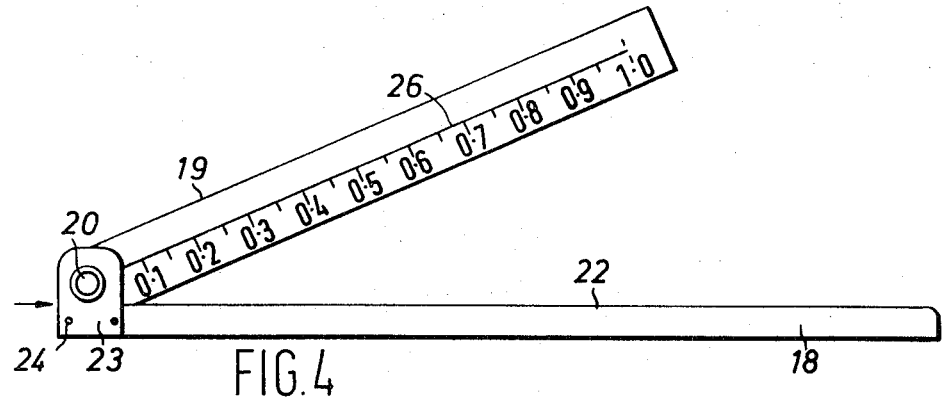
FIG. 4 is a plan view of a further embodiment of a cursor according to the invention.
Figure 5:
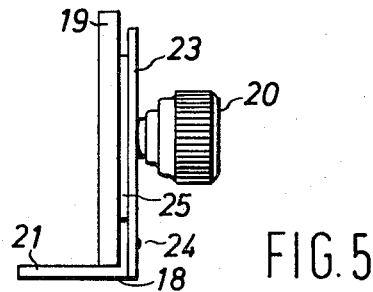
FIG. 5 is a side view in the direction of the arrow in FIG. 4.

FIG. 4 is a plan view of a further cursor 27 and FIG. 5 a side view in the direction of the arrow in FIG. 4 of the cursor 27 in accordance with the invention. This cursor 27 has a metal locating arm 18 and a transparent acrylic measuring arm 19 which are pivoted at a screw (not shown) and a locking nut 20 which can be tightened and loosened by the fingers to enable the arms 18 and 19 to be opened and closed and rigidly locked together at any angle. The locating arm 18 consists of a base strip 21 and a guide strip 22 at right angles to each other. Secured to the guide strip 22 by rivets 24 is a mount plate 23. Between the measuring arm 19 and the mount plate 23 is a washer 25. The measuring arm 19 bears a linear series of marks representing a scale 26 of Rf values from zero to 1.0.

This cursor 27 is used in association with any suitable chromatographic plate, for example that shown in FIGS. 1 and 3 but for convenience, measurements of Rf values using this cursor 27 are described with reference to FIG. 1. With a chromatographic sheet 5 placed beneath the plate 1, as previously described, the cursor 27 is placed against the base wall 3 such that the measuring arm 19 lies on top of and substantially coplanar with the upper surface of plate 1 and with the locating arm 18 held firmly against and substantially coplanar with both the base wall 3 and the upper surface of plate 1; the nut 20 is then loosened, the measuring arm 19 swivelled away from the locating arm 18, and the locating arm 18 slid along the base wall 3 until the figure 1.0 on the measuring arm 19 coincides with the position of the solvent front. The nut 20 is then tightened to lock the two arms firmly together. The cursor 27 is then slid sideways along the base wall 3 until the central line 26 of the measuring arm 19 bisects the centre of the developed spot, thus providing the Rf value.

What we claim is:

1. A measuring device suitable for use in thin-layer chromatography which device comprises in combination a substantially transparent plate having two opposed side walls which elevate said plate above a plane surface when placed thereon, a base wall between the side walls to locate a chromatographic sheet when placed beneath the plate, relative to the plate, and a linear array of orifices in said plate adjacent and substantially parallel to the base wall; and a cursor comprising a measuring portion of substantially transparent material slidable on the plate and having a scale for the measurement of Rf values of chemical components in a chromatographic sheet when placed beneath the plate, a locating portion for sliding co-operation with an edge of the plate which lies parallel to the linear array of orifices to enable Rf values to be read and wherein the unit of length is greater than or equal to the length of the run on a chromatographic sheet when used therewith.

2. A measuring device according to claim 1 wherein a portion of the plate is cut away at a corner adjacent to the base wall and a side wall thereby enabling access of the fingers to a chromatographic sheet when placed beneath the plate.

3. A measuring device according to claim 2 wherein the plate is provided with a slit having one long edge parallel to the linear array of orifices whereby a chromatographic sheet placed beneath the plate may be marked by a scriber passed through the slit and wherein the orifices are frustro-conical.

4. A measuring device according to claim 3 wherein the orifices have a diameter at the under surface of the plate greater than that at the upper surface of said plate.

5. A measuring device according to claim 4 wherein the measuring portion of the cursor is integral with the locating portion and the latter constitutes a lip for sliding co-operation with an edge of the plate which is parallel to the linear array of orifices.

6. A measuring device according to any of claim 1 wherein the measuring and locating portions of the cursor constitute two arms which are pivoted to each other whereby the measuring arm can be pivoted about an axis perpendicular to the plane of the plate when in use with said plate.

7. A measuring device according to claim 6 wherein the two arms are pivoted together at a point adjacent to one end of each of the arms and the two arms can be locked together at any angle between them.

8. A measuring device according to claim 7 wherein the locating arm comprises a member of substantially rigid material disposed in two planes substantially perpendicular to each other, and the measuring arm comprises a strip of substantially rigid and transparent material having a scale for the measurement of Rf values of chemical components and pivoted to the locating arm whereby the locating arm when placed on the plate sits thereon substantially coplanar with both the upper surface of the plate and the base wall, and the measuring arm lies upon and may be freely moved upon the upper surface of the plate about the pivot axis.

9. A measuring device according to claim 8 wherein the Rf measuring scale is an unit of length subdivided in a decimal system.

10. A measuring device according to claim 9 wherein the zero point of the Rf scale coincides with the pivot axis of the locating and measuring arms.

11. A measuring device according to claim 10 wherein the pivot axis of the locating and measuring arms, when the cursor functionally co-operates with the plate, bisects a line drawn between the centre of each of the orifices.

12. A measuring device according to claim 11 wherein said device is made from a plastics material.

13. A measuring device according to claim 12 wherein the plastics material is a polyacrylate material.

14. In a thin layer chromatographic measuring device, a cursor which comprises a locating arm comprising a member of substantially rigid material disposed in two planes substantially perpendicular to each other and a measuring arm pivoted to the locating arm and comprising a strip of substantially rigid and transparent material having a scale for measurement of Rf values of chemical components.

* * * * *